United States Patent
Sharifian et al.

(10) Patent No.: US 6,235,162 B1
(45) Date of Patent: *May 22, 2001

(54) ULTRAPURE HYDROXYLAMINE COMPOUND SOLUTIONS AND PROCESS OF MAKING SAME

(75) Inventors: Hossein Sharifian, Austin, TX (US); John W. Drew, Chatham, NJ (US)

(73) Assignee: Sachem, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,988

(22) Filed: May 28, 1998

(51) Int. Cl.[7] .............................. B01D 3/06; C01B 21/14
(52) U.S. Cl. .............................. 203/74; 203/77; 203/80; 203/86; 203/88; 423/387
(58) Field of Search ................ 203/73–74, 77, 203/80, 6, 14, 12, 86, 88; 423/387; 202/158, 267.1, 205; 159/21

(56) References Cited

U.S. PATENT DOCUMENTS

| | | | |
|---|---|---|---|
| 3,857,704 | * 12/1974 | Coulter | 203/73 |
| 4,321,313 | 3/1982 | Langer et. | 429/13 |
| 4,778,669 | 10/1988 | Fuchs et al. | 423/387 |
| 5,266,290 | * 11/1993 | Levinthal et al. | 423/387 |
| 5,281,311 | 1/1994 | Sharifian et al. | 204/101 |
| 5,382,685 | 1/1995 | Klein et al. | 564/301 |
| 5,447,610 | 9/1995 | Sharifian | 204/101 |
| 5,472,679 | 12/1995 | Levinthal et al. | 423/387 |
| 5,510,097 | * 4/1996 | Cawlfield et al. | 423/387 |
| 5,837,107 | * 11/1998 | Watzenberger et al. | 203/78 |

FOREIGN PATENT DOCUMENTS

| | | | |
|---|---|---|---|
| 2602802 | 2/1988 | (FR) | C25B/3/04 |
| 9722551 | 7/1997 | (WO) . | |

* cited by examiner

Primary Examiner—Virginia Manoharan
(74) Attorney, Agent, or Firm—Renner, Otto, Boisselle & Sklar, LLP

(57) ABSTRACT

In one embodiment, the present invention relates to a method of treating a solution containing hydroxylamine, involving subjecting the solution containing hydroxylamine to fractional distillation using a packed column thereby providing a first distillate; and subjecting the first distillate to flashover distillation thereby providing a second distillate containing a hydroxylamine solution. In another embodiment, the present invention relates to an ultrapure solution simply containing hydroxylamine, at least one stabilizer, and water.

35 Claims, 1 Drawing Sheet

ULTRAPURE HYDROXYLAMINE COMPOUND SOLUTIONS AND PROCESS OF MAKING SAME

TECHNICAL FIELD

The present invention generally relates to ultrapure hydroxylamine compound solutions and processes for making the ultrapure hydroxylamine compound solutions. In particular, the present invention relates to making ultrapure hydroxylamine compound solutions using fractional distillation and flashover distillation techniques.

BACKGROUND OF THE INVENTION

Hydroxylamine compounds have a variety of useful applications. Generally speaking, hydroxylamine compounds are strong reducing agents. Accordingly, hydroxylamine compounds are useful in stripper formulations. Stripper formulations may be used to remove photoresists from or clean a substrate. For example, hydroxylamine stripper solutions are used to remove developed photoresists, such as patterned polyimide from metal foils. Hydroxylamine stripper solutions are extensively utilized in the printed circuit board fabrication and microelectronic chip fabrication technologies. Hydroxylamine compounds are also useful as intermediaries in chemical processes, especially in the pharmaceutical and agricultural industries.

Frequently, solutions of hydroxylamine, especially solutions prepared from hydroxylammonium salts, contain undesirable amounts of impurities such as salts including hydroxylammonium salts and acid salts, various metals and metal ions, ammonia and unwanted organic materials. Thus, there also exists a need for hydroxylamine solutions having high purity. There exist several production methods to manufacture hydroxylamine compounds.

Some of these methods, however, do not provide hydroxylamine compound solutions of high purity which some applications of the compounds require. While some purification schemes exist, ultra high purity hydroxylamine compound solutions are either difficult to find or expensive to make. Consequently, there remains a substantial demand for large quantities of high purity hydroxylamine compound solutions.

SUMMARY OF THE INVENTION

In one embodiment, the present invention relates to a method of treating a solution containing hydroxylamine, involving subjecting the solution containing hydroxylamine to fractional distillation using a packed column thereby providing a first distillate; and subjecting the first distillate to flashover distillation thereby providing a second distillate comprising a hydroxylamine solution.

In another embodiment, the present invention relates to a method of purifying a solution containing hydroxylamine, involving subjecting the solution containing hydroxylamine to fractional distillation using a packed column below about 75° C. and below about 100 torr thereby providing a first distillate; and subjecting the first distillate to flashover distillation below about 80° C. and below about 100 torr thereby providing a second distillate comprising a purified hydroxylamine solution.

In yet another embodiment, the present invention relates to a method of removing at least a portion of at least one of ammonia and metal contaminants from a solution containing hydroxylamine and at least one of ammonia and metal contaminants, involving subjecting the solution containing hydroxylamine and at least one of ammonia and metal contaminants to fractional distillation using a column packed with a non-metallic material thereby providing a first distillate; and subjecting the first distillate to flashover distillation thereby providing a second distillate containing a hydroxylamine solution containing less of at least one of ammonia and metal contaminants than the solution containing hydroxylamine and at least one of ammonia and metal contaminants.

In still yet another embodiment, the present invention relates to an ultrapure solution simply containing hydroxylamine, at least one stabilizer, and water.

As a result of the present invention, concentrated and ultra-purified solutions of hydroxylamine compounds are obtainable.

DETAILED DESCRIPTION OF THE INVENTION

Figure 1:
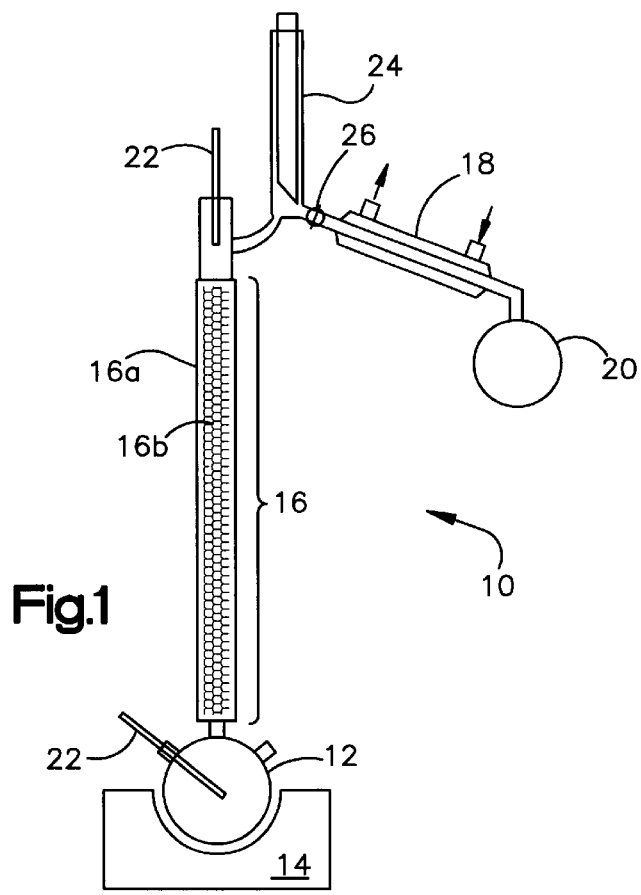
FIG. 1 illustrates a fractional distillation apparatus in accordance with one embodiment of the present invention.

The term "hydrocarbyl" is used herein to include substantially hydrocarbyl groups as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein. Examples of hydrocarbyl substituents which may be useful in connection with the present invention include alkyl, alkenyl, alicyclic and aromatic substituents.

Hydroxylamine compounds include hydroxylamine and organic hydroxylamines. Hydroxylamine compounds may be represented by the formula $(NR^1R^2OH)$ wherein $R^1$ and $R^2$ are independently hydrogen or hydrocarbyl groups containing 1 to about 6 carbon atoms, and preferably $R^1$ and $R^2$ are independently hydrogen or hydrocarbyl groups containing 1 to about 3 carbon atoms. Specific examples of $R^1$ and $R^2$ include hydrogen, and alkyl groups such as methyl, ethyl, propyl including isopropyl, butyl, etc. In embodiments where $R^1$ and $R^2$ are hydrogen, the hydroxylamine compound is hydroxylamine. In embodiments where at least one of $R^1$ and $R^2$ is a hydrocarbyl group, the hydroxylamine compound is an organic hydroxylamine. Examples of organic hydroxylamines include methylhydroxylamine, ethylhydroxylamine, propylhydroxylamine, isopropylhydroxylamine, and diethylhydroxylamine.

Hydroxylamine compounds are commercially available and may be prepared by a number of sysnthetic pathways including from their corresponding hydroxylammonium salts. Various methods of providing hydroxylamine and/or hydroxylammonium nitrate are described in U.S. Pat. Nos. 4,321,313; 4,645,579; 4,849,073; 4,968,394; 5,281,311; 5,447,610; and 5,709,789; French Patent 2,602,802; and a number of publications listed below all of which are hereby incorporated by reference for their relevant disclosure.

French Patent 2,602,802 is directed to an electrolytic process to directly produce solutions of hydroxylammonium nitrate from nitric acid. U.S. Pat. No. 4,645,579 relates to aqueous solutions of hydroxylamine which are prepared from aqueous hydroxylammonium salt solutions by electrodialysis. U.S. Pat. No. 4,849,073 relates to electrolytically producing hydroxylamine nitrate from aqueous nitric acid using a mercury cathode. U.S. Pat. 5,281,311 relates to an electrolytic process for making hydroxylamine or hydroxylamine salt solutions. U.S. Pat. No. 5,447,610 relates to preparing hydroxylamine and hydroxylammonium salts by electrolytically reducing a mixture containing at least one nitrogen oxide and either a neutral electrolyte to form hydroxylamine or an acidic electrolyte such as an organic or inorganic acid to form a hydroxylammonium salt. U.S. Pat. No. 5,709,789 relates to electrochemically converting a nitrogen containing gas to a hydroxylammonium salt and then converting the hydroxylammonium salt to hydroxylamine. The production of hydroxylamine by the electroreduction of nitric oxide in sulfuric acid is described by L. J. J. Janssen et al in *Electrochimica Acta*, 1977, Vol. 22, pp. 27–30 and by M. L. Bathia et al in *The Canadian Journal of Chemical Engineering*, Vol. 57, October 1979, pp. 631–7. The electroreduction of nitric oxide on bulk platinum in perchloric acid and sulfuric acid solutions is described by J. A. Colucci et al in *Electrochimica Acta*, Vol. 30, No. 4, pp. 521–528, 1985.

In one embodiment, the present invention provides a method of concentrating a hydroxylamine compound solution. In another embodiment, the present invention provides a method of purifying a hydroxylamine compound solution containing impurities. The amount of hydroxylamine compound typically in the solution to be purified, concentrated or treated may be from about 0.1% (by weight) to about 50%, and more typically from about 0.5% to about 25%, and even more typically from about 1.5% to about 10%.

In one embodiment, the impurities in the hydroxylamine compound solution to be purified include ionic compounds such as hydroxylammonium salts. Hydroxylammonium salts may be represented by the formula

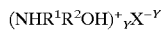

$(NHR^1R^2OH)^+_y X^{-y}$ wherein $R^1$ and $R^2$ are independently hydrogen or hydrocarbyl groups containing 1 to about 6 carbon atoms, and preferably $R^1$ and $R^2$ are independently hydrogen or hydrocarbyl groups containing 1 to about 3 carbon atoms, X is an anion of an acid or salt, and y is a number equal to the valence of X. Specific examples of anions include $Cl^-$, $Br^-$, $SO_4^{-2}$, $HSO_4^-$, $PO_4^{-3}$, $H_2PO_4^{-1}$, $HPO_4^{-2}$, $NO_3^-$, $HCO_3^-$, $CO_3^{-2}$, $ClO^-$, $H_2CO_2^-$, $CH_3CO_2^-$, $CH_3CH_2CO_2^-$, etc. The amount of hydroxylammonium salt in the hydroxylamine compound solution to be purified or treated may be from about 0.1% (by weight) to about 60%, and preferably from about 0.5% to about 30%, and more preferably from about 1% to about 5%.

Other impurities which may be present in the hydroxylamine compound solutions include unwanted organic materials, ammonia, other ionic compounds such as metal ions and acid salts, nitrogen containing gases, color and metals (alkali metals, alkaline earth metals and transition metals and ions thereof). Specific examples of commonly encountered unwanted metals (and corresponding ions) include aluminum, calcium, chromium, cobalt, copper, iron, magnesium, potassium and sodium. Examples of nitrogen containing gas include nitrogen oxide gas and nitrogen-hydrogen gas. Nitrogen oxide gas as used herein is intended to mean a gas containing nitrogen and oxygen atoms. Examples of nitrogen oxide gas include one or more of nitric oxide (NO), nitrogen dioxide ($NO_2$), nitrogen trioxide ($NO_3$), dinitrogen trioxide ($N_2O_3$), dinitrogen pentoxide $N_2O_5$. Unwanted organic materials include large molecular weight organic materials such as photoresists, ionic materials or particulate matter.

Examples of ionic compounds include salts, metal salts, acid salts or any compound which forms an anion and cation when dissolved in water or an organic solution. Typical acid salts include anions from inorganic acids such as nitric acid, halogen acids such as hydrofluoric acid, hydrochloric acid, hydrobromic acid and hydriodic acid, sulfuric acid, sulfurous acid, perchloric acid, boric acid and phosphorus acids such as phosphorous acid and phosphoric acid and organic acids including carboxylic and polycarboxylic acids such as formic acid, acetic acid, propionic acid, citric acid, oxalic acid, etc.; organic phosphorus acids such as dimethylphosphoric acid and dimethylphosphinic acid; or sulfonic acids such as methanesulfonic acid, ethanesulfonic acid, 1-pentanesulfonic acid, 1-hexanesulfonic acid, 1-heptanesulfonic acid, benzenesulfonic acid, and toluenesulfonic acid. Metal salts include any anion from the acids listed above and a cation of an alkali metal, an alkaline earth metal or a transition metal.

In other embodiments, the present invention provides methods of treating hydroxylamine compound solutions; namely, a method of separating hydroxylamine compounds from hydroxylammonium salts, a method of separating hydroxylamine compounds from unwanted organic materials, a method of separating hydroxylamine compounds from ammonia, a method of separating hydroxylamine compounds from ionic compounds, a method of separating hydroxylamine compounds from nitrogen containing gases, and a method of separating hydroxylamine compounds from metals.

The purified or unpurified, concentrated or unconcentrated, treated or untreated hydroxylamine compound solution, and any other solution described herein, may be aqueous or organic based, or mixtures thereof. In embodiments where the solution is aqueous, it is preferable to use deionized water, although tap water may be used. Organic solutions include alcohols, especially lower alcohols (containing 1 to about 4 carbon atoms), glycols, and other polar organic liquids.

The hydroxylamine compound solution may also contain a stabilizer for the hydroxylamine compound because hydroxylamine compounds tend to decompose in solution in some instances. The stabilizer may be added to the initial solution, to the first and/or second distillate, and/or to the receiving flask of the flashover distillation apparatus. In one embodiment, the hydroxylamine compound solution contains at least two stabilizers. Examples of stabilizers include quinoline derivatives, thiocarboxylic acids, thiosulfates, flavones, hydroxyanthraquinones, anthocyanidines, etc. Specific examples include 8-hydroxyquinoline, morin hydrate, cyanidinium chloride, quinalizarine, benzonitrile, benzamidoxime, isocyanates, N-phenyl-N-hydroxythiourea, 2,3-didehydrohexono-1,4-lactone, alkali metal salts of ethylenediaminetetraacetic acid, and quercetin. The amount of stabilizer in a hydroxylamine compound solution may range from about $5\times10^{-4}\%$ to about 1% by weight of the solution. In another embodiment, the amount of stabilizer in a hydroxylamine compound solution may range from about $5\times10^{-3}\%$ to about 0.1% by weight of the solution.

The hydroxylamine compound solution is subjected to a two-step distillation process so that at least a portion of the impurities of the hydroxylamine compound solution are removed. In a preferred embodiment, substantially all of the impurities (more than about 99% by weight of the impurities) of the hydroxylamine compound solution are removed. In a more preferred embodiment, more than about 99.9% of the impurities of the hydroxylamine compound solution are removed. In a most preferred embodiment, more than about 99.99% of the impurities of the hydroxylamine compound solution are removed.

The two-step distillation process generally involves performing fractional distillation on the initial hydroxylamine compound solution and subsequently performing flashover distillation on the solution obtained from fractional distillation. In the context of the present invention, fractional distillation produces a first distillate which is optionally treated and then subjected to flashover distillation producing a second distillate. The second distillate may also be optionally treated.

The terms "initial solution" and "initial hydroxylamine compound solution" refer to a hydroxylamine compound solution which may be subjected to the methods of the present invention. The term "first distillate" refers to the portion of the initial solution subjected to reflux (fractionation and rectification) in the fractional distillation apparatus that remains or returns to the flask which is heated. The portion of the initial solution that passes through the fractional distillation apparatus to the receiving flask (vaporized and condensed into the receiving flask) is not the first distillate. The term "second distillate" refers to the specific portion of the flashover distillation distillate collected in the receiving flask that contains a hydroxylamine compound. The first and second distillate do not refer to portions of the fractional distillation distillate or flashover distillation distillate which do not contain a hydroxylamine compound (such as a portion containing volatile organic compounds that vaporize and condense before the hydroxylamine compound).

During the inventive method, it is generally desirable to maintain the temperature of the solutions within the range from about 1° C. to about 75° C., since in some instances, temperatures above about 75° C. may induce the decomposition of some hydroxylamine compounds.

Also during the inventive method, it is generally desirable to maintain the pH of the solutions within certain ranges. However, since the pH of the solutions changes over the course of practicing the present invention, and since the pH of the individual solutions (initial solution, first distillate and second distillate) may be different, the following parameters are provided as a general guide. In the initial solution not yet subjected to the two-step distillation process, the pH range may be from about 14 to about 7, and typically from about 12 to about 9. In the first distillate collected after fractional distillation, the pH range may be from about 14 to about 7, and preferably from about 13 to about 9. In the second distillate collected after flashover distillation, the pH range may be from about 12 to about 8, and preferably from about 11 to about 9.

Various specific fractional distillation techniques are known to those skilled in the art, and any appropriate technique may be used in accordance with the present invention. Nevertheless, a general example of a fractional distillation apparatus is shown in FIG. 1. The fractional distillation apparatus 10 shown contains a first flask or container 12, a heating mechanism 14 for heating the first flask 12, a packed column 16, a condenser 18, and a receiving flask or container 20. The packed column 16 contains a column 16a and packing material 16b. The apparatus 10 may be equipped with thermometers 22 and a cold-finger condenser 24. A valve 26 is located between the packed column 16 and condenser 18. Although not shown, the apparatus 10 may be connected to a controllable vacuum to set a desired pressure.

In operation, the first flask 12 contains the initial hydroxylamine compound solution to be purified and is heated by the heating mechanism 14 so that various components volatize. As vapors rise up the packed column 16, a portion of the vapor condenses and flows back down the packed column 16 to the first flask (fractionation or rectification). Consequently, condensed liquid contacts additional vapor in countercurrent fashion leading to an efficient purification or concentration of the hydroxylamine compound. In a preferred embodiment, valve 26 is closed in the early stages (for example, about 5 to 20 minutes) of performing fractional distillation thereby conditioning the packed column 16. If the packed column 16 is conditioned by starting with valve 26 closed, valve 26 is opened after conditioning.

Some vapor eventually reaches the condenser 18 wherein condensation takes place and the condensate flows to the receiving flask 20. Selected portions of the vapor condensed in the condenser 18, a majority of which is organic solvents, ammonia and/or water, may be collected and discarded. After various impurities (organic solvents, ammonia and/or water) are removed via fractional distillation, the first distillate is collected from the first flask 12.

In one embodiment, the pressure under which fractional distillation is conducted is below about 100 torr. In another embodiment, the pressure under which fractional distillation is conducted is below about 75 torr. In yet another embodiment, the pressure under which fractional distillation is conducted is below about 50 torr. In one embodiment, the temperature of the initial hydroxylamine compound solution during fractional distillation is below about 75° C. In another embodiment, the temperature of the initial hydroxylamine compound solution during fractional distillation is below about 70° C. In yet another embodiment, the temperature of the initial hydroxylamine compound solution during fractional distillation is below about 65° C.

In another embodiment, the temperature of the initial hydroxylamine compound is above 65° C. and below about 75° C. and the pressure under which the fractional distillation is conducted is above 50 torr and below about 100 torr. In another embodiment, the temperature of the initial hydroxylamine compound is below about 70° C. and the pressure under which the fractional distillation is conducted is below about 50 torr.

The packed column is of sufficient length to obtain a concentrated and/or purified hydroxylamine compound solution (first distillate). The length of the packed column depends upon the size of the first flask and the concentration of the various components in the initial solution. In one embodiment, when using a 1 liter first flask, the packed column is at least 6 inches in length. In another embodiment, when using a 1 liter first flask, the packed column is at least 10 inches in length. In a preferred embodiment, when using a 1 liter first flask, the packed column is at least 12 inches in length. The length of the packed column is appropriately lengthened or shortened with an increase or decrease in the size of the first flask (generally longer with increasing first flask size) and -relative to the vapor pressure of the components in the initial solution to be separated (generally longer when vapor pressures of components are relatively close to each other and generally shorter when vapor pressures of components are relatively far apart).

It may be desirable to reflux the initial hydroxylamine compound solution for a time sufficient to remove volatile impurities from the initial solution before collecting the first distillate and to condition the packed column. In one embodiment, the initial solution is refluxed for at least about 5 minutes. In another embodiment, the initial solution is refluxed for at least about 10 minutes. In a preferred embodiment, the initial solution is refluxed for at least about 15 minutes.

The packing material of the packed column may be any material which induces fractionation or rectification of the initial hydroxylamine compound solution while not further contaminating the initial hydroxylamine compound solution. In a preferred embodiment, the packing material is not a metal degraded or corroded in a basic environment, which may add to the metal content of the initial hydroxylamine compound solution. General examples of suitable packing material include plastics, glass, ceramic materials, certain metals and metal alloys. Suitable metals and metal alloys include titanium, tantalum, niobium, and Hastealloy (various nickel based alloys such as NiFeCr). In a preferred embodiment, the packing material is a halogen containing plastic, glass or other nonmetallic material. Examples of plastics include polyolefins such as polyethylene, polypropylene and copolymers thereof, polyesters such as polyethylene terephthalate and polybutylene terephthalate, fluorine containing polymers such as polytetrafluoroethylene (Teflon) and polyvinylidene fluoride (Kynar).

The packing material of the packed column may take any physical shape including mesh, spheres, beads, random particulates, fibers (random, woven, and knitted), gauze, saddles such as Intalox saddles and Berl saddles, rings such as Pall rings and Raschig rings, plates, any combination thereof, or any other structure that induces fractionation or rectification of vapor from the initial hydroxylamine compound solution while not further contaminating the initial hydroxylamine compound solution.

Fractional distillation generally permits certain substances, such as volatile compounds including solvents, water, ammonia, nitrogen containing gases and small molecular weight organics to pass through the distillation apparatus to the receiving flask while not permitting substantial amounts of hydroxyamine compounds to pass. A major amount (more than 50%) of the hydroxylamine compound remains in the first flask or does not reach the condenser during fractional distillation.

Flashover distillation generally permits substances in liquid form, such as hydroxylamine compounds and solvents and water to pass through the distillation apparatus while not permitting ionic compounds such as hydroxylammonium salts, metal ions and acid salts and metal impurities to pass. During flashover distillation, the first distillate collected from the first flask of the fractional distillation apparatus is quickly vaporized, condensed and collected from the receiving flask in such a way that the vapor is in equilibrium with the collected liquid (second distillate). This is mainly due to the low volatility of ionic compounds and metals, contributing to the separation of hydroxylamine compounds from hydroxylammonium salts.

Figure 2:
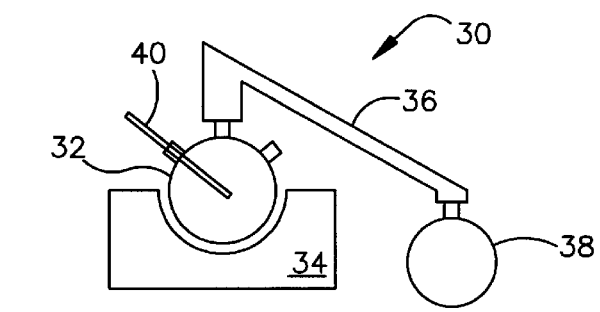
FIG. 2 illustrates a flashover distillation apparatus in accordance with one embodiment of the present invention.

Various specific flashover distillation techniques are known to those skilled in the art, and any appropriated technique may be used in accordance with the present invention. Nevertheless, a general example of a flashover distillation apparatus is shown in FIG. 2. The flashover distillation apparatus 30 shown contains a first flask or container 32, a heating mechanism 34 for heating the first flask 32, a u-tube or condenser 36, a receiving flask or container 38 and a thermometer 40. Although not shown, the apparatus 30 may be connected to a controllable vacuum to set a desired pressure. In operation, the first flask 32 contains the first distillate obtained from fractional distillation and is heated by the heating mechanism 34 so that various components volatize. As vapors rise up and into the u-tube or condenser 36, the vapor condenses and flows to the receiving flask 38. Selected portions of the vapor condensed in the u-tube or condenser 36 may be collected.

Figure 3:
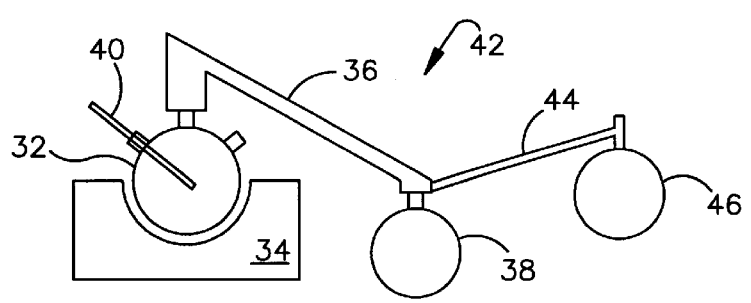
FIG. 3 illustrates another flashover distillation apparatus in accordance with one embodiment of the present invention.

Another general example of a flashover distillation apparatus is shown in FIG. 3 (reference numerals analogous to those of FIG. 2 remain the same). The flashover distillation apparatus 42 shown contains a first flask or container 32, a heating mechanism 34 for heating the first flask 32, a u-tube or condenser 36, a first receiving flask or container 38, a thermometer 42, a connecting tube 44 and a second receiving flask or container 46. Although not shown, the apparatus 42 may be connected to a controllable vacuum to set a desired pressure. In operation, the first flask 32 contains the first distillate obtained from fractional distillation and is heated by the heating mechanism 34 so that various components volatize. As vapors rise up and into the u-tube or condenser 36, the vapor condenses and flows to either the first receiving flask 38 or second receiving flask 46. Selected portions of the vapor condensed in the u-tube or condenser 36 may be collected.

When the receiving flask(s) of the flashover distillation apparatus are positioned in contact with an ice bath, the apparatus of FIG. 3 may serve in some instances to minimize ice build-up in a vapor trap used in connection with a vacuum line (not shown in either FIG. 2 or 3).

In one embodiment, the pressure under which flashover distillation is conducted is below about 100 torr. In another embodiment, the pressure under which flashover distillation is conducted is below about 60 torr. In yet another embodiment, the pressure under which flashover distillation is conducted is below about 40 torr. In one embodiment, the temperature of the first distillate during flashover distillation is below about 80° C. In another embodiment, the temperature of the first distillate during flashover distillation is below about 75° C. In yet another embodiment, the temperature of the first distillate during flashover distillation is below about 70° C. In a preferred embodiment, the temperature of the first distillate during flashover distillation is higher than the temperature of the initial hydroxylamine compound solution during fractional distillation.

In another embodiment, the temperature of the first distillate during flashover distillation is below about 80° C. and the pressure under which the flashover distillation is conducted is above 50 torr and below about 100 torr. In another embodiment, the temperature of the first distillate during flashover distillation is below about 75° C. and the pressure under which the flashover distillation is conducted is below about 6 torr.

The collection flask of the flashover distillation apparatus may be any material which does not further contaminate the hydroxylamine compound solution collected. In a preferred embodiment, the collection flask (or the inner surface of the collection flask in contact with the second distillate) is a non-metallic receiver, which does not add to the metal content of the purified hydroxylamine compound solution (second distillate). Examples of non-metallic materials include plastics, glass and other non-metallic materials. In a preferred embodiment, the non-metallic material is a halogen containing plastic or glass. Examples of plastics include polyolefins such as polyethylene, polypropylene and copolymers thereof, polyesters such as polyethylene terephthalate and polybutylene terephthalate, fluorine containing polymers such as polytetrafluoroethylene (Teflon) and polyvinylidene fluoride (Kynar).

Optionally, the collection flask of the flashover distillation apparatus may be maintained at a temperature below room temperature. Lower temperatures serve to stabilize the hydroxylamine compound. In a preferred embodiment, the collection flask of the flashover distillation apparatus is positioned in contact with an ice bath.

The hydroxylamine compound solution which is recovered or collected after being treated by the two-part distillation apparatus contains at least one of a relatively higher ratio of a hydroxylamine compound to impurities such as hydroxylammonium salts than the hydroxylamine compound solution initially charged to the two-part distillation apparatus; a higher concentration of a hydroxylamine compound than the hydroxylamine compound solution initially charged to the two-part distillation apparatus; and a lower concentration of hydroxylammonium salt than the hydroxylamine compound solution initially charged to the two-part distillation apparatus. Most impurities, ionic compounds such as hydroxylammonium salts, metal ions, and acid salts, ammonia, organic compounds including large molecular weight organic compounds and metals, either pass through the fractional distillation apparatus and thus are not collected with the first distillate or do not pass through the flashover distillation apparatus and thus are not collected with the second distillate.

The concentration of the hydroxylamine compound in the hydroxylamine compound solution (first distillate) which is collected from the first flask of the fractional distillation apparatus (does not pass through the fractional distillation apparatus) may be from about 75% (by weight) to about 25%, and preferably from about 65% to about 40%, and more preferably from about 60% to about 50%. The concentration of the hydroxylamine compound in the hydroxylamine compound solution (second distillate) which is collected from the receiving flask of the flashover distillation apparatus (passes through the flashover distillation apparatus) may be from about 75% (by weight) to about 25%, and preferably from about 65% to about 40% and more preferably from about 60% to about 50%.

When the hydroxylamine compound solution (second distillate) which is treated by the two-part distillation process contains a lower concentration of ammonia than the hydroxylamine compound solution initially charged to the two-part distillation apparatus, the ratio of the amount of ammonia which does not accompany the purified or concentrated hydroxylamine compound as it evolves to the second distillate compared to the amount of ammonia in the initial solution charged to the two-part distillation apparatus is described as the percent rejected. In one embodiment, the percent rejection of ammonia is greater than about 90%, preferably greater than about 95%, more preferably greater than about 99%, and even about 100%.

The hydroxylamine compound solution (second distillate) which is treated by the two-part distillation process contains a lower concentration of ammonium ions than the hydroxylamine compound solution initially charged to the two-part distillation apparatus. In most embodiments, ammonium ions are rejected; that is, they are not recovered from the two-part distillation apparatus. In these embodiments, the percent rejection of ammonium ions is greater than about 90%, preferably greater than about 95%, more preferably greater than about 99%, and even about 100%.

The collected hydroxylamine compound solution (second distillate) which is treated by the two-part distillation apparatus may be subjected to repeated distillations one or more times thereby markedly enhancing the percent rejection of ammonia and/or ionic compounds such as hydroxylammonium salts and/or color from the initial hydroxylamine solution. In a preferred embodiment, an initial hydroxylamine solution is subjected to the two-part distillation process at least two times. In another preferred embodiment, an initial hydroxylamine solution is subjected to fractional distillation two or more times and flashover distillation at least once. In yet another preferred embodiment, an initial hydroxylamine solution is subjected to fractional distillation at least once and flashover distillation two or more times. The inventive method can be practiced batchwise or in a continuous operation.

The purified hydroxylamine compound solutions obtained after performing the two-part distillation process are ultrapure solutions of a hydroxylamine compound. In one embodiment, the ultrapure solutions of a hydroxylamine compound contain less than about 0.01% by weight of ammonia. In a preferred embodiment, the ultrapure solutions of a hydroxylamine compound contain less than about 0.001% by weight of ammonia. In a most preferred embodiment, the ultrapure solutions of a hydroxylamine compound contain less than about 0.0001% by weight of ammonia.

The purified hydroxylamine compound solutions obtained after performing the two-part distillation process are substantially metal free (metal and/or metal ions). Metals which may contaminate hydroxylamine compound solutions include alkali metals, alkaline earth metals and transition metals, such as aluminum, calcium, chromium, cobalt, copper, iron, magnesium, potassium and sodium. In one embodiment, the ultrapure solutions of a hydroxylamine compound contain less than about 20 ppb of metal. In a preferred embodiment, the ultrapure solutions of a hydroxylamine compound contain less than about 10 ppb of metal. In a most preferred embodiment, the ultrapure solutions of a hydroxylamine compound contain less than about 1 ppb of metal.

The purified hydroxylamine compound solutions obtained after performing the two-part distillation process are substantially free of hydroxylammonium salts. In one embodiment, the ultrapure solutions of a hydroxylamine compound contain less than about 0.01% by weight of a hydroxylammonium salt. In a preferred embodiment, the ultrapure solutions of a hydroxylamine compound contain less than about 0.001% by weight of a hydroxylammonium salt. In a more preferred embodiment, the ultrapure solutions of a hydroxylamine compound contain less than about 0.0001% by weight of a hydroxylammonium salt.

The purified hydroxylamine compound solutions obtained after performing the two-part distillation process are substantially free of ionic compounds. In one embodiment, the ultrapure solutions of a hydroxylamine compound contain less than about 0.01% by weight of an ionic compound. In a preferred embodiment, the ultrapure solutions of a hydroxylamine compound contain less than about 0.001% by weight of an ionic compound. In a more preferred embodiment, the ultrapure solutions of a hydroxylamine compound contain less than about 0.0001% by weight of an ionic compound.

The purified hydroxylamine compound solutions obtained after performing the two-part distillation process typically contain a hydroxylamine compound, a solvent, and one or more stabilizers (which are added or already present in the collection or receiving flask of the flashover distillation apparatus). In one embodiment, the ultrapure solutions of a hydroxylamine compound contain about 10% or more by weight of a hydroxylamine compound. In another embodiment, the ultrapure solutions of a hydroxylamine compound contain about 25% or more by weight of a hydroxylamine compound. In a preferred embodiment, the ultrapure solutions of a hydroxylamine compound contain about 35% or more by weight of a hydroxylamine compound. In a most preferred embodiment, the ultrapure solutions of a hydroxylamine compound contain about 50% or more by weight of a hydroxylamine compound. The amount of stabilizer is not critical and varies with the percentage of a hydroxylamine compound, the identity of the hydroxylamine compound and the identity of the stabilizer(s), but is not critical to the invention.

The following specific examples illustrate the preparation of the purified hydroxylamine compound solutions according to the present invention. Unless otherwise indicated in the examples and elsewhere in the specification and claims, all parts and percentages are by weight, and temperatures are in degrees centigrade.

EXAMPLE 1

A fractional distillation apparatus generally similar to FIG. 1 is employed. 750 ml of a 15.4% aqueous hydroxylamine solution containing less than 1% quercetin is charged to a 1 l flask equipped with a thermometer. The flask is connected to two unsilvered glass columns (each 12"×¾") packed with Teflon mesh. The aqueous hydroxylamine solution is refluxed for 15 minutes, then collected. During fractional distillation, the temperature of the hydroxylamine solution is 49° C. under a pressure of 27.5 torr. 455 ml of liquid is collected from the receiving flask and 315 ml of a 34.1% hydroxylamine solution is collected from the 1 l flask.

A flashover distillation apparatus generally similar to FIG. 2 is employed. 100 ml of a 34.1% hydroxylamine solution is charged to a 250 ml flask equipped with a thermometer. The flask is connected to an unsilvered condenser and an unsilvered 100 ml collecting flask positioned partially in an ice bath. During flashover distillation, the temperature of the hydroxylamine solution is 65° C. under a pressure of 39 torr. 51 ml of a 51% hydroxylamine solution is collected. The hydroxylamine solution collected contains no detectable ammonia (less than 0.0001%), no detectable quercetin and 5 ppb sodium. Stabilizer can be added to the collected hydroxylamine solution.

EXAMPLE 2

A fractional distillation apparatus generally similar to FIG. 1 is employed. 800 ml of a 12.3% aqueous hydroxylamine solution containing 2% hydroxylammonium sulfate is charged to a 1 l flask equipped with a thermometer. The flask is connected to two unsilvered glass columns (each 12"×¾") packed with Teflon mesh. The aqueous hydroxylamine solution is refluxed for 15 minutes, then collected. During fractional distillation, the temperature of the hydroxylamine solution is 48° C. under a pressure of 27.7 torr. 385 ml of liquid is collected from the receiving flask and 415 ml of a 24.1% hydroxylamine solution is collected from the 1 l flask.

A flashover distillation apparatus generally similar to FIG. 2 is employed. 100 ml of a 24.1% hydroxylamine solution is charged to a 250 ml flask equipped with a thermometer. The flask is connected to an unsilvered condenser and an unsilvered 100 ml collecting flask positioned partially in an ice bath. During flashover distillation, the temperature of the hydroxylamine solution is 60° C. under a pressure of 33 torr. 48 ml of a 44% hydroxylamine solution is collected. The hydroxylamine solution collected contains no detectable ammonia, no detectable hydroxylammonium sulfate and 3 ppb sodium.

EXAMPLE 3

A fractional distillation apparatus generally similar to FIG. 1 is employed. 750 ml of a 9.1% aqueous hydroxylamine solution is charged to a 1 l flask equipped with a thermometer. The flask is connected to two unsilvered glass columns (each 12"×¾") packed with Teflon mesh. The aqueous hydroxylamine solution is refluxed for 15 minutes, then collected. During fractional distillation, the temperature of the hydroxylamine solution is 65° C. under a pressure of 25.2 torr. 390 ml of liquid is collected from the receiving flask and 340 ml of a 16.7% hydroxylamine solution is collected from the 1 l flask.

A flashover distillation apparatus generally similar to FIG. 2 is employed. 100 ml of a 16.7% hydroxylamine solution is charged to a 250 ml flask equipped with a thermometer. The flask is connected to an unsilvered condenser and an unsilvered 100 ml collecting flask positioned partially in an ice bath. During flashover distillation, the temperature of the hydroxylamine solution is 62° C. under a pressure of 29 torr. 42 ml of a 35% hydroxylamine solution is collected. The hydroxylamine solution collected contains no detectable ammonia and 7 ppb sodium.

EXAMPLE 4

A fractional distillation apparatus generally similar to FIG. 1 is employed. 350 ml of a 30.6% aqueous hydroxylamine solution containing 1.75% hydroxylammonium nitrate is charged to a 1 l flask equipped with a thermometer. The flask is connected to two unsilvered glass columns (each 12"×¾") packed with Teflon mesh. The aqueous hydroxylamine solution is refluxed for 15 minutes, then collected. During fractional distillation, the temperature of the hydroxylamine solution is 58° C. under a pressure of 27.5 torr. 130 ml of liquid is collected from the receiving flask and 215 ml of a 49.8% hydroxylamine solution is collected from the 1 l flask.

A flashover distillation apparatus generally similar to FIG. 2 is employed. 100 ml of a 49.8% hydroxylamine solution is charged to a 250 ml flask equipped with a thermometer. The flask is connected to an unsilvered condenser and an unsilvered 100 ml collecting flask positioned partially in an ice bath. During flashover distillation, the temperature of the hydroxylamine solution is 68° C. under a pressure of 43 torr. 54 ml of a 64% hydroxylamine solution is collected. The hydroxylamine solution collected contains no detectable ammonia, no detectable hydroxylammonium nitrate and less than 1 ppb sodium.

EXAMPLE 5

A fractional distillation apparatus generally similar to FIG. 1 is employed. 700 ml of a 28.7% aqueous hydroxylamine solution is charged to a 1 l flask equipped with a thermometer. The flask is connected to two unsilvered glass columns (each 12"×¾") packed with Kynar mesh. The aqueous hydroxylamine solution is refluxed for 10 minutes, then collected. During fractional distillation, the temperature of the hydroxylamine solution is 63° C. under a pressure of 19 torr. 385 ml of liquid is collected from the receiving flask and 315 ml of a 41.8% hydroxylamine solution is collected from the 1 l flask.

A flashover distillation apparatus generally similar to FIG. 3 is employed. 100 ml of a 41.8% hydroxylamine solution is charged to a 250 ml flask equipped with a thermometer. The flask is connected to an unsilvered condenser, a first unsilvered 100 ml collecting flask positioned partially in an ice bath and a second unsilvered 100 ml collecting flask positioned partially in an ice bath. During flashover distillation, the temperature of the hydroxylamine solution is 70° C. under a pressure of 45 torr. 45 ml of a 37.8% hydroxylamine solution is collected in the first receiver and 13 ml of a 11.8% hydroxylamine solution is collected in the second receiver. The hydroxylamine solution collected contains no detectable ammonia, 1 ppb potassium and 1 ppb sodium.

EXAMPLE 6

A fractional distillation apparatus generally similar to FIG. 1 is employed. 675 ml of a 39.8% aqueous hydroxylamine solution containing 1.4% hydroxylammonium nitrate and 0.01% 8-hydroxyquinoline is charged to a 1 l flask equipped with a thermometer. The flask is connected to three unsilvered glass columns (each 12"×¾") packed with Kynar mesh. The aqueous hydroxylamine solution is refluxed for 5 minutes, then collected. During fractional distillation, the temperature of the hydroxylamine solution is 64° C. under a pressure of 46 torr. 370 ml of liquid is collected from the receiving flask and 305 ml of a 52.3% hydroxylamine solution is collected from the 1 l flask.

A flashover distillation apparatus generally similar to FIG. 3 is employed. 100 ml of a 52.3% hydroxylamine solution is charged to a 250 ml flask equipped with a thermometer. The flask is connected to an unsilvered condenser, a first unsilvered 100 ml collecting flask positioned partially in an ice bath and a second unsilvered 100 ml collecting flask positioned partially in an ice bath. During flashover distillation, the temperature of the hydroxylamine solution is 69° C. under a pressure of 45 torr. 53 ml of a 61.4% hydroxylamine solution is collected in the first receiver and 11 ml of a 27.2% hydroxylamine solution is collected in the second receiver. The hydroxylamine solution collected contains no detectable ammonia, no detectable hydroxylammonium nitrate, no detectable 8-hydroxyquinoline, 1 ppb potassium and 1 ppb sodium. Stabilizer can be added to the collected hydroxylamine solution.

EXAMPLE 7

A fractional distillation apparatus generally similar to FIG. 1 is employed. 725 ml of a 41% aqueous hydroxylamine solution is charged to a 1 l flask equipped with a thermometer. The flask is connected to one unsilvered glass column (12"×¾") packed with unsilvered glass beads. The aqueous hydroxylamine solution is refluxed for 10 minutes, then collected. During fractional distillation, the temperature of the hydroxylamine solution is 59° C. under a pressure of 41 torr. 415 ml of liquid is collected from the receiving flask and 310 ml of a 52.3% hydroxylamine solution is collected from the 1 l flask.

A flashover distillation apparatus generally similar to FIG. 3 is employed. 100 ml of a 52.3% hydroxylamine solution is charged to a 250 ml flask equipped with a thermometer. The flask is connected to an unsilvered condenser, a first unsilvered 100 ml collecting flask positioned partially in an ice bath and a second unsilvered 100 ml collecting flask positioned partially in an ice bath. During flashover distillation, the temperature of the hydroxylamine solution is 73° C. under a pressure of 25 torr. 50 ml of a 68.7% hydroxylamine solution is collected in the first receiver and 19 ml of a 48.5% hydroxylamine solution is collected in the second receiver. The hydroxylamine solution collected contains no detectable ammonia, 1 ppb potassium and 1 ppb sodium.

EXAMPLE 8

A fractional distillation apparatus generally similar to FIG. 1 is employed. 730 ml of a 15.9% aqueous hydroxylamine solution containing 1.66% hydroxylammonium sulfate and less than 1% 8-hydroxyquinoline is charged to a 1 l flask equipped with a thermometer. The flask is connected to two unsilvered glass columns (each 12"×¾") packed with Teflon mesh. The aqueous hydroxylamine solution is refluxed for 15 minutes, then collected. During fractional distillation, the temperature of the hydroxylamine solution is 48° C. under a pressure of 27.4 torr. 435 ml of liquid is collected from the receiving flask and 300 ml of a 34.5% hydroxylamine solution is collected from the 1 l flask.

A flashover distillation apparatus generally similar to FIG. 2 is employed. 100 ml of a 34.5% hydroxylamine solution is charged to a 250 ml flask equipped with a thermometer. The flask is connected to an unsilvered condenser and an unsilvered 100 ml collecting flask positioned partially in an ice bath. During flashover distillation, the temperature of the hydroxylamine solution is 66° C. under a pressure of 40 torr. 52 ml of a 52% hydroxylamine solution is collected. The hydroxylamine solution collected contains no detectable 8-hydroxyquinoline, no detectable hydroxylammonium sulfate, no detectable ammonia and no detectable metals. Stabilizer can be added to the collected hydroxylamine solution.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of treating a solution containing hydroxylamine, comprising:
    subjecting the solution comprising hydroxylamine to fractional distillation using a packed column at a temperature below about 70° C. and at a pressure below about 50 torr, thereby providing a first distillate; and
    subjecting the first distillate to flashover distillation at a temperature below about 80° C., thereby providing a second distillate comprising a treated hydroxylamine solution.

2. The method of claim 1, wherein the packed column comprises a non-metallic material comprising a plastic.

3. The method of claim 2, wherein the non-metallic material comprises at least one of polyvinylidene fluoride, polytetrafluoroethylene, polypropylene and polyethylene.

4. The method of claim 1, wherein the solution comprising the hydroxylamine further comprises at least one of ammonia and a stabilizer.

5. The method of claim 1, wherein the second distillate comprising the hydroxylamine solution comprises less than about 0.001% by weight ammonia.

6. The method of claim 1, wherein the second distillate comprising hydroxylamine solution comprises less than about 1 ppb of metal contaminants.

7. The method of claim 1, wherein the second distillate is collected in a non-metallic receiver.

8. The method of claim 7, wherein the non-metallic receiver comprises a plastic.

9. The method of claim 1, wherein flashover distillation is conducted at a temperature below about 80° C. and at a pressure above 50 torr and below about 100 torr.

10. A method of treating a solution containing hydroxylamine, comprising:

subjecting the solution comprising hydroxylamine to fractional distillation using a packed column at a temperature below about 75° C., thereby providing a first distillate; and subjecting the first distillate to flashover distillation at a temperature below about 75° C. and at a pressure below about 60 torr, thereby providing a second distillate comprising a treated hydroxylamine solution.

11. The method of claim 10, wherein fractional distillation is conducted at a temperature above 65° C. and below about 75° C., and at a pressure above 50 torr and below about 100 torr.

12. The method of claim 10, wherein the packed column comprises a non-metallic material comprising a plastic.

13. The method of claim 12, wherein the non-metallic material comprises at least one of polyvinylidene fluoride, polytetrafluoroethylene, polypropylene and polyethylene.

14. The method of claim 10, wherein the solution comprising the hydroxylamine further comprises at least one of ammonia and a stabilizer.

15. The method of claim 10, wherein the second distillate comprising the hydroxylamine solution comprises less than about 0.001% by weight ammonia.

16. The method of claim 10, wherein the second distillate comprising hydroxylamine solution comprises less than about 1 ppb of metal contaminants.

17. The method of claim 10, wherein the second distillate is collected in a non-metallic receiver.

18. The method of claim 17, wherein the non-metallic receiver comprises a plastic.

19. A method of purifying a solution containing hydroxylamine, comprising:

subjecting the solution comprising hydroxylamine to fractional distillation using a packed column below about 75° C. and below about 100 torr thereby providing a first distillate; and subjecting the first distillate to flashover distillation below about 80° C. and below about 100 torr thereby providing a second distillate comprising a purified hydroxylamine solution.

20. The method of claim 19, wherein the packed column comprises a non-metallic material comprising a plastic or a glass.

21. The method of claim 20, wherein the non-metallic material comprises at least one of polyvinylidene fluoride, polytetrafluoroethylene, polypropylene and polyethylene.

22. The method of claim 19, wherein the second distillate is collected in a non-metallic receiver.

23. The method of claim 22, wherein the non-metallic receiver comprises a plastic.

24. The method of claim 19, wherein fractional distillation is conducted at a temperature above 65° C. and below about 75° C., and at a pressure above 50 torr and below about 100 torr.

25. The method of claim 19, wherein flashover distillation is conducted at a temperature below about 80° C. and at a pressure above 50 torr and below about 100 torr.

26. A method of removing at least a portion of at least one of ammonia, ionic compounds and metal contaminants from a solution containing hydroxylamine and at least one of ammonia, ionic compounds and metal contaminants, comprising:

subjecting the solution comprising hydroxylamine and at least one of ammonia, ionic compounds and metal contaminants to fractional distillation using a column packed with a non-metallic material at a temperature above 65° C. and below about 75° C. and at a pressure above 50 torr and below about 100 torr, thereby providing a first distillate; and subjecting the first distillate to flashover distillation at a temperature below about 75° C., thereby providing a second distillate comprising a hydroxylamine solution comprising less of at least one of ammonia, ionic compounds and metal contaminants than the solution containing hydroxylamine and at least one of ammonia, ionic compounds and metal contaminants.

27. The method of claim 26, wherein the second distillate comprising the hydroxylamine solution comprises less than about 0.0001% by weight ammonia.

28. The method of claim 26, wherein the second distillate comprising hydroxylamine solution comprises less than about 1 ppb of metal contaminants.

29. The method of claim 26, wherein the non-metallic material comprises a plastic or a glass.

30. The method of claim 26, wherein the non-metallic material comprises at least one of polyvinylidene fluoride, polytetrafluoroethylene, polypropylene and polyethylene.

31. A method of removing at least a portion of at least one of ammonia, ionic compounds and metal contaminants from a solution containing hydroxylamine and at least one of ammonia, ionic compounds and metal contaminants, comprising:

subjecting the solution comprising hydroxylamine and at least one of ammonia, ionic compounds and metal contaminants to fractional distillation using a column packed with a non-metallic material at a temperature below about 70° C. thereby providing a first distillate; and subjecting the first distillate to flashover distillation at a temperature below about 80° C. and at a pressure above 50 torr and below about 100 torr, thereby providing a second distillate comprising a hydroxylamine solution comprising less of at least one of ammonia, ionic compounds and metal contaminants than the solution containing hydroxylamine and at least one of ammonia, ionic compounds and metal contaminants.

32. The method of claim 31, wherein the second distillate comprising the hydroxylamine solution comprises less than about 0.0001% by weight ammonia.

33. The method of claim 31, wherein the second distillate comprising hydroxylamine solution comprises less than about 1 ppb of metal contaminants.

34. The method of claim 31, wherein the non-metallic material comprises a plastic or a glass.

35. The method of claim 31, wherein the non-metallic material comprises at least one of polyvinylidene fluoride, polytetrafluoroethylene, polypropylene and polyethylene.

* * * * *